March 1, 1932. J. A. WARK 1,847,798
FISHING DEVICE
Filed April 29, 1931

Joseph A. Wark,
INVENTOR.

BY J. Stanley Burch
ATTORNEY.

Patented Mar. 1, 1932

1,847,798

UNITED STATES PATENT OFFICE

JOSEPH A. WARK, OF BARRE, VERMONT

FISHING DEVICE

Application filed April 29, 1931. Serial No. 533,821.

This invention relates to an improved fishing device, and has more particular reference to a novel device adapted to be secured to a stationary support and embodying a rotatably mounted fish line reel having electrical means associated therewith for intermittently closing a signaling circuit and indicating that a fish has taken the bait, when the reel is rotated by the fish pulling on the fish line.

The primary object of the present invention is to provide a fishing reel and signal of the above kind which is extremely simple and durable in construction and efficient and reliable in operation.

A further object of the invention is to provide a device of the above kind in which the reel and base may be readily separated and compactly arranged when not in use.

Other objects and features of the invention will become apparent from the following description when considered in connection with the accompanying drawings, in which.

Figure 1:
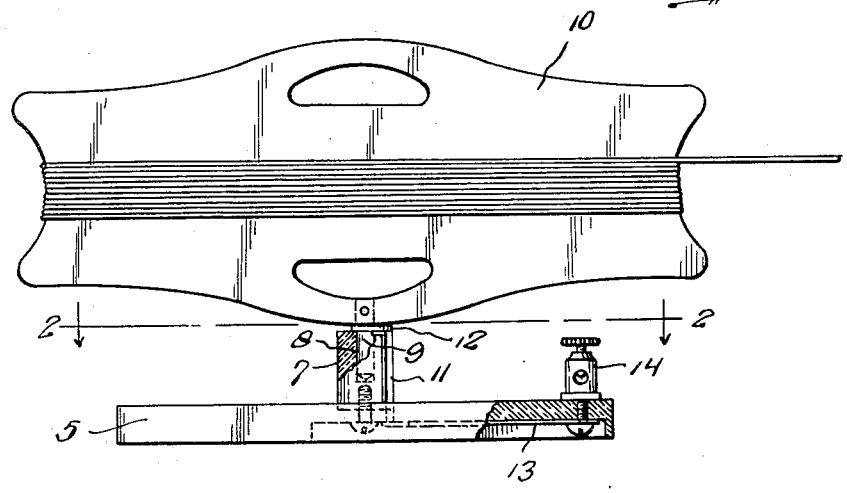
Figure 1 is an elevational view, partly broken away and in section, of a fishing device embodying the present invention.
Figure 2:
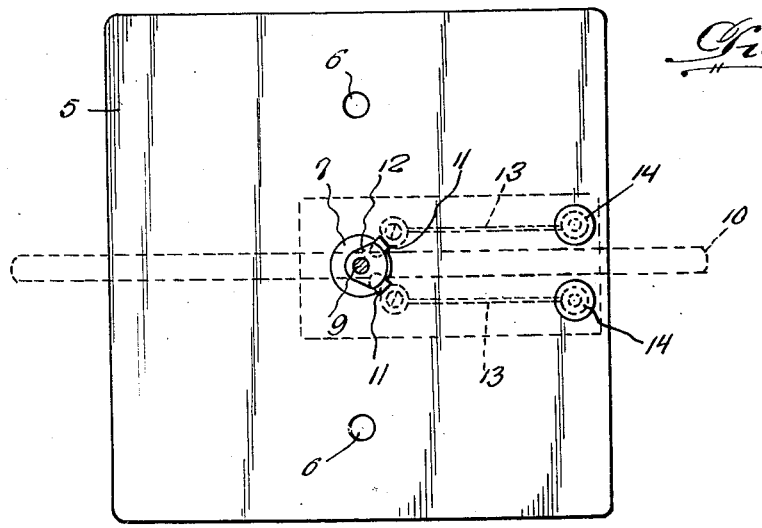
Figure 2 is a horizontal section taken on line 2—2 of Figure 1.

Referring more in detail to the drawings, the present invention includes a relatively large flat base 5 of insulating material, provided with openings 6 to receive screws or the like whereby the device may be securely anchored to a stationary object or support. Rigidly secured to and projecting upwardly from the center of the base 5 is a post 7 of insulating material, having a socket 8 in the upper end thereof in which is removably journaled the depending stub shaft 9 carried by a fish line reel 10. The fish line reel 10 is vertically disposed and has the stub shaft 9 attached thereto so as to depend from its lower longitudinal edge intermediate the ends of the reel.

Carried by the post 7 are two conductor strips 11 whose upper ends are exposed at and flush with the upper end surface of the post 7. The upper ends of the strips 11 are spaced apart, and carried by the lower longitudinal edge of the reel 10 is a conductor plate 12 of a size to bridge the ends of the strips 11 and intermittently electrically connect them when the reel 10 is rotated. The conductor strips 11 extend downwardly through the base 5 and have their lower ends connected by means of wires 13 with the respective ones of a pair of binding posts 14 mounted upon the base 5 adjacent one edge thereof.

Figure 3:
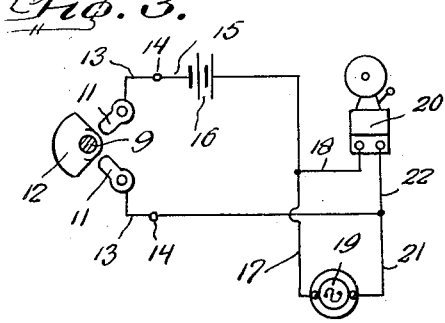
Figure 3 is a wiring diagram of the signaling circuit.

As shown in Figure 3, a wire 15 may be used to connect one binding post 14 to one side of a battery 16 whose other side may be connected by wires 17 and 18, respectively with one terminal of a lamp 19 and a bell 20. The other terminals of the lamp 19 and bell 20 may be connected by wires 21 and 22 with the other binding post 14.

When the device is in use, the reel 10 is normally set so that the bridging plate 12 is disengaged from the ends of the contact strips 11 as shown in Figure 3, whereby the signaling circuit is broken. Should the bait be taken by a fish and a pull be exerted upon the fish line wound upon the reel 10, said reel will be rotated so as to cause the strips 11 to be intermittently bridged by the plate 12. Obviously, each time the strips 11 are bridged by the contact plate 12, the signaling circuit will be closed and the lamp 19 will be lighted and the bell 20 caused to ring. This will definitely indicate to the fisherman that the line needs attention should he be busy at the time with other duties. Obviously, when a number of the devices are simultaneously employed with a number of different fish lines, each device may be provided with a distinctive color of lamp and tone of bell so that the fisherman may readily distinguish which particular line needs attention. By providing for both a visible and an audible signal, the device will be efficient equally as well at night as in the day time. It will be noted that the reel 10 may be detached from the base 5 by simply withdrawing the shaft 9 from the socket in the post 7, whereupon these parts may be compactly arranged for convenience in storing and transportation.

From the above description it is believed that the construction, operation and advantages of the present invention will be readily understood and appreciated by those skilled in the art. It will be particularly noted that the device is extremely simple and durable in construction so that the same will not readily get out of order and may be economically manufactured as well as readily placed into practical use.

Minor changes are contemplated within the spirit and scope of the invention as claimed.

What I claim as new is:

1. A fishing device of the character described including a base having a rigid upstanding post provided with a socket in the upper end thereof, a vertical fish line reel having a shaft depending from its lower longitudinal edge and journaled in the socket of said post, spaced contact strips carried by the post and having their upper ends exposed at the top of said post, a bridging plate for said contact strips carried by the lower longitudinal edge of the reel and adapted to intermittently electrically connect the contact strips when the reel is rotated, and means for electrically including said contact strips in a signaling circuit.

2. A fishing device of the character described including a base adapted to be secured to a support and provided with an upstanding post, a vertical fish line reel having a shaft depending from its lower longitudinal edge and removably journaled in the upper end of said post, contacts exposed at the upper end of the post, a bridging plate carried by the lower edge of the reel and adapted to intermittently electrically connect said contacts when the reel is rotated, and binding posts carried by the base and electrically connected to the respective contacts, whereby the latter may be included in a signaling circuit.

In testimony whereof I affix my signature.

JOSEPH A. WARK.